F. H. & F. C. THOMPSON.
LOCK FOR COUPLING NUTS.
APPLICATION FILED JAN. 19, 1916.
1,208,236.
Patented Dec. 12, 1916.
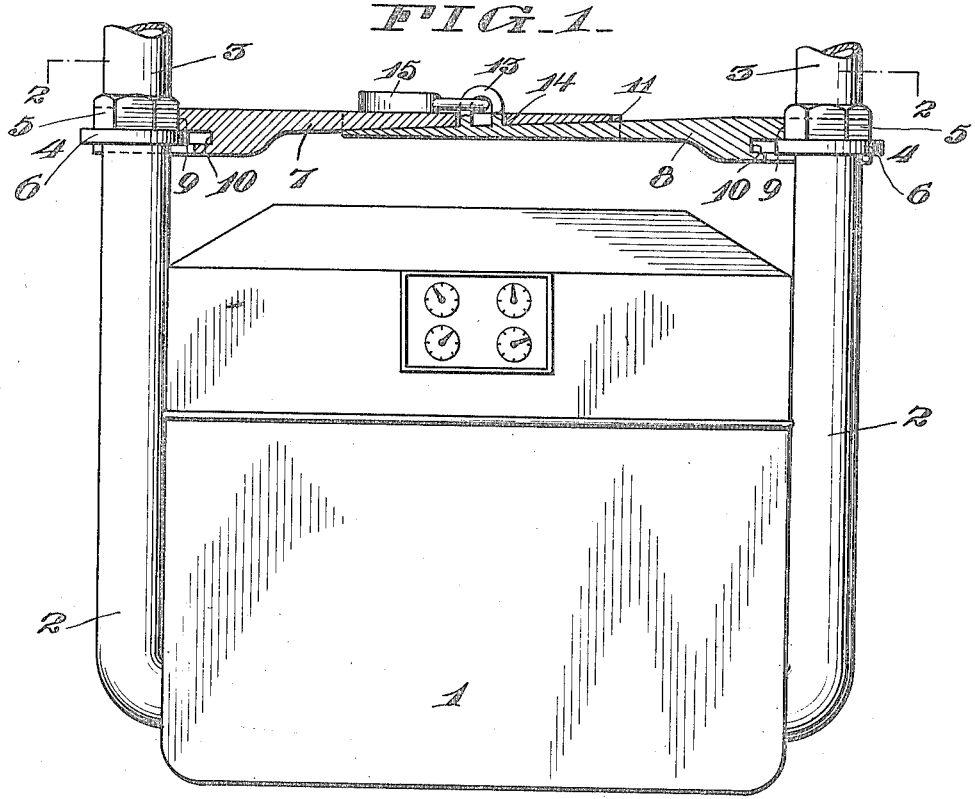
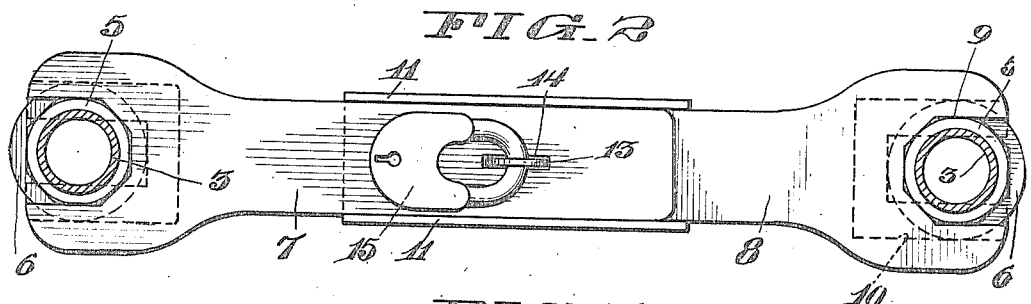
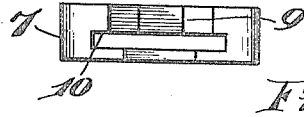
Witnesses
Wm. Conway
C. R. Ziegler.
Inventors
Frank H. Thompson,
Frank C. Thompson.
By Joshua R. H. Potts.
their Attorney

UNITED STATES PATENT OFFICE.

FRANK H. THOMPSON AND FRANK C. THOMPSON, OF PHILADELPHIA, PENNSYLVANIA.

LOCK FOR COUPLING-NUTS.

1,208,236.   Specification of Letters Patent.   Patented Dec. 12, 1916.

Application filed January 19, 1916. Serial No. 72,994.

*To all whom it may concern:*

Be it known that we, FRANK H. THOMPSON and FRANK C. THOMPSON, citizens of the United States, residing at Philadelphia, county of Philadelphia, and State of Pennsylvania, have invented certain new and useful Improvements in Locks for Coupling-Nuts, of which the following is a specification.

Our invention relates to improvements in locks for coupling nuts, the object of the invention being to provide improved means for locking the unions or coupling nuts of gas meters and other similar mechanisms which prevent any possibility of tampering with the unions by unauthorized persons.

A further object is to provide improvements of the character stated which can be readily placed in position, which can be cheaply manufactured and which most effectually perform the functions for which they are intended.

With these and other objects in view, the invention consists in certain novel features of construction and combinations and arrangements of parts as will be more fully hereinafter described and pointed out in the claims.

In the accompanying drawings: Figure 1 is a view in front elevation showing an ordinary type of gas meter with our improved union lock illustrated in longitudinal section. Fig. 2 is a sectional plan view on the line 2—2 of Fig. 1, and Fig. 3 is an end view of one member of the lock.

While our invention is capable of a wide range of modification, we have illustrated in the accompanying drawings a preferred embodiment in which—

1 represents an ordinary gas meter, and 2, 2, are the pipes communicating with the respective ends thereof. The pipes 3, 3, are connected to the pipes 2, 2, by ordinary unions or coupling nuts 4, and these unions have angular portions 5 with a circular flange 6 at one edge.

Our improved locking mechanism comprises two members 7 and 8. These members each have in one end, an angular socket 9 which intersects the upper face thereof and conforms in shape to the shape of the angular portion 5 of the union. Each member 7 and 8 has, in the walls of its socket 9, a recess 10 which receives the flange 6 of the union. In the present instance, the union is of the octagonal form, and of course it is to be understood that the shape of socket 9 will be such as to accommodate the union and prevent any possibility of turning of the union. Member 8 is provided at its edges with flanges 11 to receive between them the member 7 and prevent lateral movement of the members relative to each other. Member 8 is provided with a staple 13 integral therewith or fixed thereto in any approved manner which projects through a slot 14 in member 7, and 15 is an ordinary padlock which when positioned through the staple 13, effectually locks the members 7 and 8 together.

When the members engage the unions in their normal locking positions as shown, the engagement of the walls of recesses 9 with the angular portions 5 of the union prevent any turning movement of the unions, and the location of flanges 6 in the recesses 10 prevent any movement of members 7 and 8 longitudinally of the pipes, hence the only way that the unions can be turned is to remove members 7 and 8, and they cannot be removed until separated, hence the possessor of the key to the padlock is the only one that can remove the unions without detection.

Various slight changes might be made in the general form and arrangement of parts described without departing from our invention, and hence we do not limit ourselves to the precise details set forth, but consider ourselves at liberty to make such changes and alterations as fairly fall within the spirit and scope of the appended claims.

Having thus described our invention, what we claim as new and desire to secure by Letters Patent is:

1. A lock for flanged coupling nuts in a device of the character described, comprising two members, each member having an angular socket intersecting the upper face thereof and being designed to receive and prevent turning of the angular portion of the nuts and having an additional recess in the walls of the socket designed to receive the flange of a respective nut to prevent said members from being moved longitudinally of the pipe, and means locking the members together, substantially as described.

2. The combination with a pair of flanged coupling nuts spaced apart, said nuts each having flat faces and an annular flange, of a coupling device comprising two members, each member having a socket designed to receive and prevent turning of flat faces of said nuts, said sockets also having recesses in the walls thereof for receiving said flanges of the nuts, one member having a slot therein, the other member having a staple projecting through the slot, a lock on the staple, one of said members having flanges at its edges forming a guideway open at its top for confining the edges of the other member, substantially as described.

In testimony whereof we have signed our names to this specification in the presence of two subscribing witnesses.

FRANK H. THOMPSON.
FRANK C. THOMPSON.

Witnesses:
M. B. CATTELL,
C. E. POTTS.